United States Patent
Hart et al.

(10) Patent No.: US 9,816,594 B2
(45) Date of Patent: Nov. 14, 2017

(54) TWIN AXIS TWIN-MODE CONTINUOUSLY VARIABLE TRANSMISSION

(71) Applicant: GM Global Technology Operations LLC, Detroit, MI (US)

(72) Inventors: James M. Hart, Belleville, MI (US); Daryl A. Wilton, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 83 days.

(21) Appl. No.: 14/940,941

(22) Filed: Nov. 13, 2015

(65) Prior Publication Data
US 2017/0138450 A1    May 18, 2017

(51) Int. Cl.
*F16H 37/02*    (2006.01)
*F16H 37/08*    (2006.01)
*F16H 3/66*    (2006.01)

(52) U.S. Cl.
CPC ....... *F16H 37/022* (2013.01); *F16H 37/0813* (2013.01); *F16H 3/663* (2013.01); *F16H 2037/023* (2013.01); *F16H 2200/0034* (2013.01); *F16H 2200/2005* (2013.01); *F16H 2200/2023* (2013.01)

(58) Field of Classification Search
CPC ......... F16H 2037/023; F16H 2037/025; F16H 2037/026; F16H 37/0846; F16H 37/0853; F16H 37/086
See application file for complete search history.

(56) References Cited

U.S. PATENT DOCUMENTS

| | | | | | |
|---|---|---|---|---|---|
| 4,392,394 | A | * | 7/1983 | Hofbauer | B60K 5/04 475/204 |
| 4,608,032 | A | * | 8/1986 | Stockton | F16H 47/065 474/28 |
| 4,624,153 | A | * | 11/1986 | Itoh | F16H 37/0846 475/211 |
| 4,784,018 | A | * | 11/1988 | Okada | F16H 37/022 474/18 |
| 4,876,920 | A | * | 10/1989 | Eichenberger | F16H 37/021 474/28 |
| 5,853,343 | A | * | 12/1998 | Eggert | F16H 37/022 475/210 |
| 6,106,428 | A | * | 8/2000 | Koneda | F16H 37/022 475/210 |
| 7,309,067 | B2 | * | 12/2007 | Kita | F16H 37/022 475/210 |
| 2009/0264242 | A1 | * | 10/2009 | Carey | B60K 17/08 475/210 |

* cited by examiner

*Primary Examiner* — Tisha Lewis

(57) ABSTRACT

A continuously variable transmission (CVT) for a motor vehicle includes a transmission input shaft rotatably connected to an engine by a torque converter, the transmission input shaft defining a first CVT axis. A continuously variable unit connected for rotation by the transmission input shaft includes a first pulley assembly, a second pulley assembly, and a flexible member wrapped around the first pulley assembly and the second pulley assembly. A two mode transfer gear assembly is connected to the second pulley assembly and is coaxially aligned for rotation on a second CVT axis. A clutch assembly having at least one clutch is connected to the transfer gear assembly. A final drive unit connected to the transfer gear assembly is co-axially aligned with respect to the second CVT axis.

14 Claims, 3 Drawing Sheets

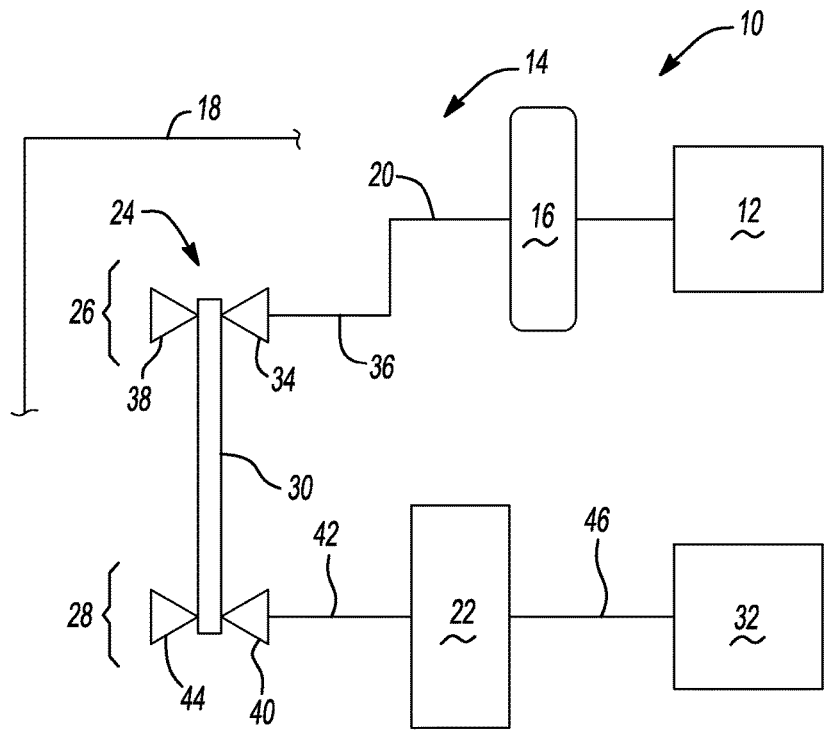
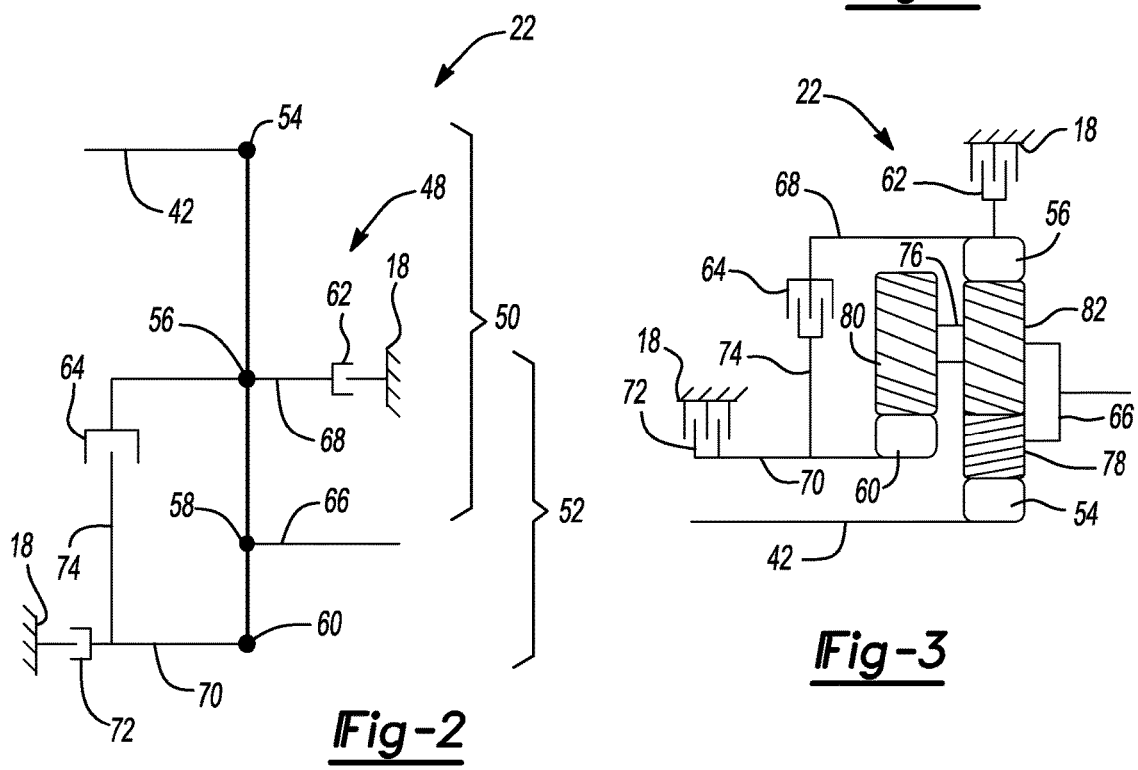

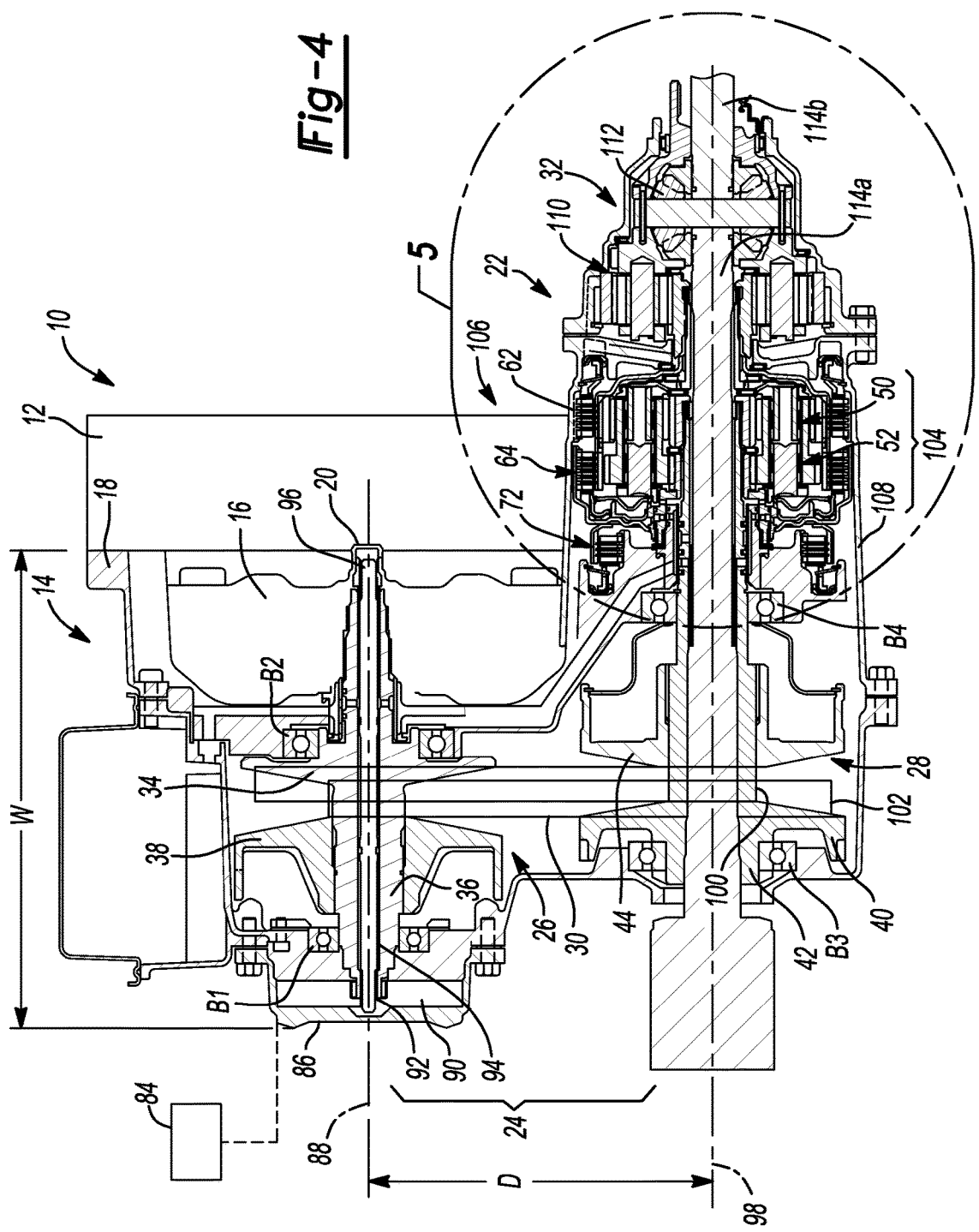

TWIN AXIS TWIN-MODE CONTINUOUSLY VARIABLE TRANSMISSION

FIELD

The present disclosure relates to automatic transmissions and more particularly to a two-mode continuously variable transmission having components configured on two axes.

BACKGROUND

The statements in this section merely provide background information related to the present disclosure and may or may not constitute prior art.

A continuously variable transmission ("CVT") typically includes a belt and pulley system that operatively couples a rotary power source, such as an engine or electric motor, to a double gear final drive unit. The belt and pulley system generally includes first and second pairs of pulley cones having a torque transmitting belt or chain extending between the cone pairs. Each pulley cone pair includes an axially stationary pulley member and an axially movable pulley member. Each movable pulley member is axially adjustable with respect to the stationary pulley member by a hydraulic system. The hydraulic system provides primary and secondary hydraulic pressures to the respective movable pulley members to adjust the running radius of the first and second pulley cone pairs which in turn controls the output/input ratio of the continuously variable transmission. Movement of the cones steplessly or continuously varies the ratio of an input speed to an output speed. With the continuously variable transmission, small but effective ratio changes can be attained. This is in contrast to a fixed gear ratio unit where any ratio changes are step values.

CVT axial length and mass significantly impact its power density and efficiency. Known CVTs include four (4) rotational axes, which typically include a first axis rotatably supporting a first movable pulley set, a second axis rotatably supporting a second movable pulley set, a third axis for an intermediate member such as a transfer shaft, and a fourth axis defining an output axle or rotational output member. Each axis of rotation requires independent sets of bearing members, increasing mass and costs, and the four axes configuration extends both an axial length and a lateral width of the CVT. Accordingly, there is a constant need for improved CVT designs that minimize axial length, width, and mass while providing sufficient performance characteristics.

SUMMARY

A twin axis two-mode CVT is provided for a motor vehicle. In one aspect of the present disclosure, the continuously variable transmission (CVT) for a motor vehicle includes a transmission input shaft rotatably connected to an engine by a torque converter, the transmission input shaft defining a first CVT axis. A continuously variable unit connected for rotation by the transmission input shaft includes a first pulley assembly, a second pulley assembly, and a flexible member wrapped around the first pulley assembly and the second pulley assembly. A two mode transfer gear assembly is connected to the second pulley assembly and is coaxially aligned for rotation on a second CVT axis. A clutch assembly having at least one clutch is connected to the transfer gear assembly. A final drive unit connected to the transfer gear assembly is co-axially aligned with respect to the second CVT axis.

In another aspect of the present disclosure, the two mode transfer gear assembly includes a first planetary gear set and a second planetary gear set.

In another aspect of the present disclosure, a ring gear of the first planetary gear set is connected for rotation to a ring gear of the second planetary gear set.

In another aspect of the present disclosure, a carrier of the first planetary gear set is connected for rotation to a carrier of the second planetary gear set by a carrier hub.

In another aspect of the present disclosure, the final drive unit includes a final drive planetary gear set connected between the carrier hub and the differential.

In another aspect of the present disclosure, the carrier hub is splined to a sun gear of the final drive planetary gear set.

In another aspect of the present disclosure, the clutch assembly includes a first clutch brake having interleaved plates connected to structure of a housing portion of the transmission output assembly and to a first flange portion of a ring gear connecting member, the ring gear connecting member connecting a ring gear of the first planetary gear set to a ring gear of the second planetary gear set.

In another aspect of the present disclosure, the clutch assembly further includes: a clutch having interleaved plates connected to a second flange portion of the ring gear connecting member and to a combined connecting member; and a second clutch brake having interleaved plates connected to structure of the housing portion of the transmission output assembly and to the combined connecting member.

In another aspect of the present disclosure, the combined connecting member is connected to a sun gear of the first planetary gear set.

In another aspect of the present disclosure, a hydraulic pump is connected to a transmission housing having multiple vanes or a gear, hereinafter referred to as vanes rotatably disposed therein; and a pin shaft is rotatably disposed within and extending through a central bore of the first pulley hub, the vanes of the hydraulic pump connected for axial rotation to the pin shaft; wherein the pin shaft and the vanes are co-axially aligned with the first CVT axis.

In another aspect of the present disclosure, the pin shaft further extends through the torque converter and includes an engagement end connected to a torque converter housing which rotates at a rotational speed of the engine, therefore the pin shaft rotates at a rotational speed of the engine.

In another aspect of the present disclosure, the first pulley assembly is connected for axial rotation to the torque converter turbine and is co-axially disposed for rotation on the first CVT axis; and the second pulley assembly includes an elongated shaft co-axially aligned with and axially rotatable with respect to the second CVT axis.

In another aspect of the present disclosure, the final drive unit includes a differential and a drive shaft each rotatable and co-axially aligned with respect to the second CVT axis Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is schematic diagram of a power train of the present disclosure;

FIG. 2 is lever diagram of the power train of FIG. 1;

FIG. 3 is stick diagram of the power train of FIG. 1;

FIG. 4 is a schematic and cross-sectional view of the powertrain of FIG. 1; and

DETAILED DESCRIPTION

Figure 5:
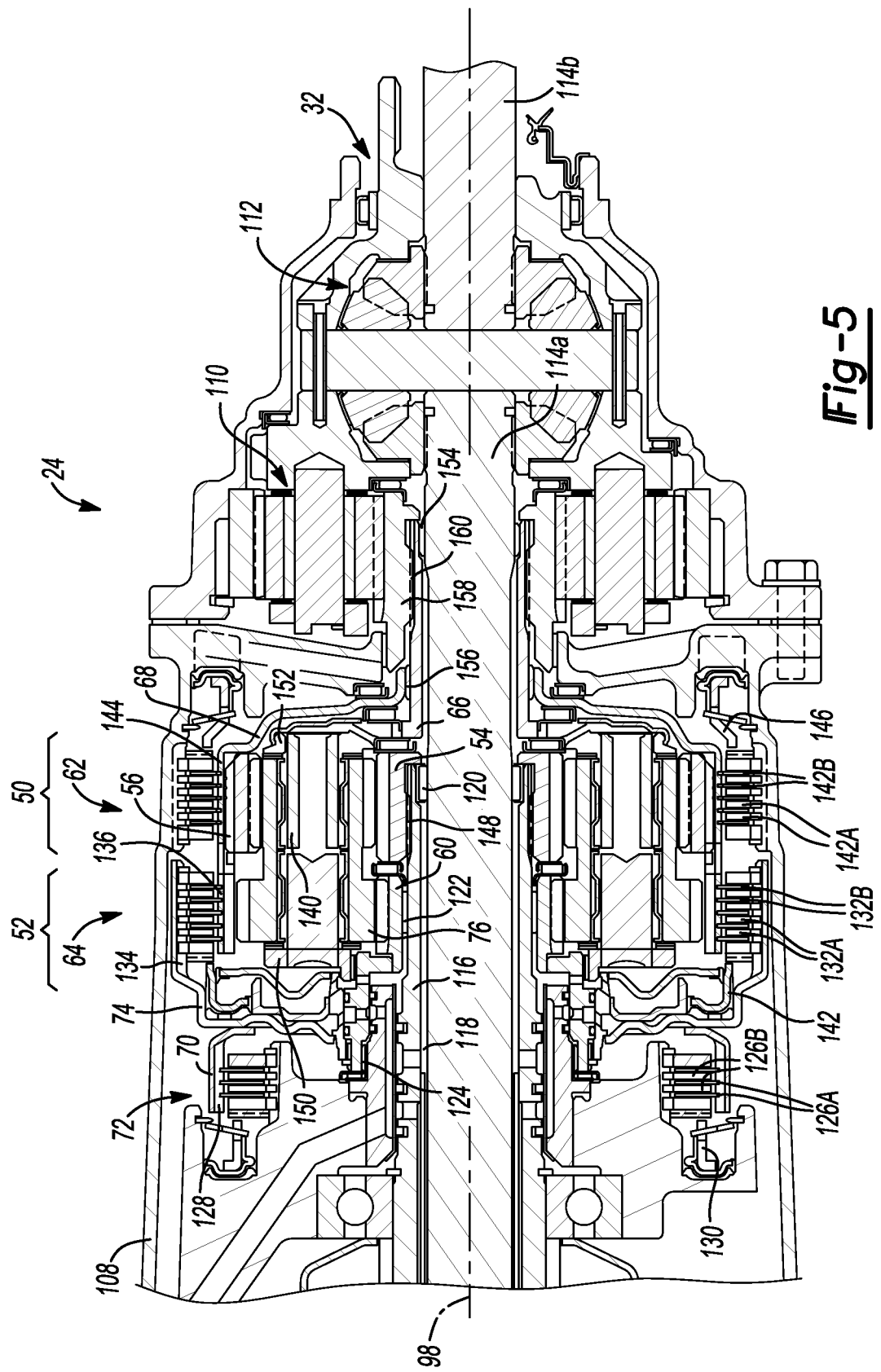
FIG. 5 is a cross-sectional view at area 5 of FIG. 4.

The following description is merely exemplary in nature and is not intended to limit the present disclosure, application, or uses.

With reference to FIG. 1, a powertrain for a motor vehicle is generally indicated by reference number 10. The powertrain 10 includes an engine 12 (shown in block form) interconnected with a transmission 14. The engine 12 may be a conventional gasoline, Diesel, or flex fuel internal combustion engine, a hybrid engine, or an electric motor, or any other type of prime mover, without departing from the scope of the present disclosure. The engine 12 supplies a driving torque to the transmission 14 through, for example, a torque converter 16. It should be appreciated that other starting devices may be employed, such as a launch clutch.

The transmission 14 is a variable diameter pulley or sheave drive continuously variable transmission (CVT). The CVT 14 includes a typically cast, metal housing 18 which encloses and protects the various components of the CVT 14. The housing 18 includes a variety of apertures, passageways, shoulders and flanges which position and support these components. Generally speaking, the CVT 14 includes a transmission input shaft 20 rotated by the engine 12, and a transmission dual output or two mode transfer gear assembly, defining a transmission output assembly 22. The transmission input shaft 20 is functionally interconnected with the engine 12 through the torque converter 16 and thereby receives input torque or power from the engine 12. Connected between the transmission input shaft 20 and the transmission output assembly 22 is a continuously variable unit 24 which includes a first pulley assembly 26 and a second pulley assembly 28. The first pulley assembly 26 is rotatably connected to the second pulley assembly 28 using a flexible member 30 such as a V-belt or chain. The second pulley assembly 28 cooperates with the transmission output assembly 22 to provide forward and reverse speed ratios between the transmission input shaft 20 and a final drive unit 32. The transmission output assembly 22 provides two modes or ranges of speed ratios to the final drive unit 32, as will be described below. The final drive unit 32 may include a differential, axle shafts, and road wheels (not shown).

The first pulley assembly 26 includes an axially rotatable first truncated conical pulley sheave 34 which is fixed to a first pulley hub 36. A truncated conical second pulley sheave 38 is axially displaceable toward and away from the first pulley sheave 34 on the first pulley hub 36. The second pulley assembly 28 includes an axially rotatable truncated conical third pulley sheave 40 which is fixed to an elongated second pulley hub 42. A truncated conical fourth pulley sheave 44 is axially displaceable toward and away from the third pulley sheave 40. Output from the transmission output assembly 22 is transferred to the final drive unit 32 by a carrier hub 46.

Referring to FIG. 2 and again to FIG. 1, the CVT 14 is illustrated in a four node lever diagram format. A lever diagram is a schematic representation of the components of a mechanical device such as meshing gear sets or planetary gear sets. Each individual lever represents a planetary gear set or meshed gear pair. The three basic mechanical components of the planetary gear are each represented by a node while the gear pairs are represented by a node and the rotation change represented by a node fixed to ground. Therefore, a single lever contains three nodes. In a planetary gear set, one node represents the sun gear, one the planet gear carrier, and one the ring gear. In a meshed gear pair, one node represents a first gear, one a second gear, and the third the rotational direction change between the meshed gears.

In some cases, two levers may be combined into a single lever having more than three nodes, and typically four nodes. For example, if two nodes on two different levers are connected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve appropriate ratios and ratio progression. Mechanical couplings or connections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

For example, the transmission output assembly 22 includes a planetary gear set assembly 48 having a first planetary gear set 50 and a second planetary gear set 52. The planetary gear set assembly 48 includes four nodes: a first node 54, a second node 56, a third node 58, and a fourth node 60. Each of the nodes 54, 56, 58, and 60 represent one or more of a sun gear member, a planet carrier member, and a ring gear member of the planetary gear assembly 48. The first node 54 defining the input is coupled to the second pulley hub 42. Where one member of the planetary gear assembly 48 is coupled with another member of the planetary gear assembly 48, those two members are represented by a single one of the second or third nodes 56 or 58. The second node 56 is commonly connected to a first clutch brake 62 and also to a clutch 64. The third node 58 is coupled to a combined carrier member 66, which provides output to the final drive unit 32. A common connecting member 68 connects the first clutch brake 62 and the clutch 64. The first clutch brake 62 is selectively grounded to the housing 18 representing a change in rotational direction. The fourth node 60 is connected via a combined connecting member 70 to a second clutch brake 72 which is selectively grounded to the housing 18 representing a change in rotational direction. The combined connecting member 70 is also connected by an extending portion 74 to the clutch 64.

According to several aspects, the first node 54 represents a sun gear of the first planetary gear set 50 while the fourth node 60 represents a sun gear of the second planetary gear set 52. The second node 56 represents a ring gear of the first planetary gear set 50 fixed to the connecting member 68 which is connected to both the first clutch brake 62 and to the clutch 64. The third node 58 represents the combined carrier member 66 connected to each of the first and the second planetary gear sets 50, 52. The fourth node 60 is coupled by the combined connecting member 70 to the second clutch brake 72, which when selectively engaged is grounded to the housing 18. The clutch 64 is selectively coupled to the combined connecting member 70 by the extending portion 74.

Referring to FIG. 3 and again to FIGS. 1-2, a stick diagram presents a schematic layout of one aspect of the transmission output assembly 22 according to the present disclosure. In FIG. 3 the numbering from the lever diagram of FIG. 2 is carried over. The clutches and couplings are correspondingly presented whereas the nodes of the planetary gear sets now appear as components of planetary gear sets such as sun gears, ring gears, planet gears and planet gear carriers.

For example, the first planetary gear set 50 is configured as a simple planetary gear set while the second planetary gear set 52 is a compound planetary gear set or plane. The planetary gear sets 50, 52 are connected as the single planetary gear set arrangement 48. The first and the second planetary gear sets 50, 52 include the common planet carrier member 66, the common ring gear member 68, the sun gear 54, and the sun gear 60. The common planet carrier member 66 rotatably supports a set of planet gears 76 (only one of which is shown) and 78 (only one of which is shown). The planet gears 76 are stepped pinions having a first stepped portion 80 and a second stepped portion 82. The first stepped portion 80 of the planet gears 76 are each configured to intermesh with the sun gear 60. The second stepped portion 82 of the planet gears 76 are each configured to intermesh with both the ring gear member 56 and the non-stepped planet gears 78. The non-stepped planet gears 78 each intermesh with both the second stepped portion 82 of the planet gears 76 and the sun gear 54. The compound or common carrier member 66 is connected to both the first planetary gear set 50 and the second planetary gear set 52.

The sun gear 54 is connected for common rotation with the second pulley hub 42 defining the input to the transmission output assembly 22. The planet carrier member 66 is connected for common rotation with the final drive unit 32 defining the output from the transmission output assembly 22. The sun gear 60 is connected for common rotation with the combined connecting member 70. The common ring gear member 68 is connected for common rotation with both the first clutch brake 62 and the clutch 64. The elongated planet gears 76 of the first planetary gear set 50 are integral with outer ring pinions of the second planetary gear set 52.

The first clutch brake 62 is selectively engageable to connect the common ring gear member 68 with the transmission housing 18 in order to restrict relative rotation of the common ring gear member 68. The second clutch brake 72 is selectively engageable to connect the combined connecting member 70 and the sun gear 60 with the transmission housing 18 in order to restrict relative rotation of the combined connecting member 70 and therefore the sun gear 60. The clutch 64 is selectively engageable to connect the common ring gear member 68 with the combined connecting member 70.

Referring to FIG. 4 and again to FIGS. 1-3, the first pulley assembly 26 includes the axially rotatable first truncated conical pulley sheave 34 which is fixed to the first pulley hub 36. The truncated conical second pulley sheave 38 is axially displaceable toward and away from the first pulley sheave 34 using a hydraulic controlled piston and fluid pressure controlled by a hydraulic control system 84 provided with hydraulic fluid pressure using a hydraulic pump 86. The torque converter 16, the first pulley hub 36, and the first and second pulley sheaves 34, 38 all co-axially rotate with respect to a first CVT axis 88. The second pulley sheave 38 co-rotates with respect to the first CVT axis 88 when the second pulley sheave 38 is frictionally engaged to the flexible member 30. A housing of the hydraulic pump 86 is connected to the transmission housing 18, and multiple vanes 90 of the hydraulic pump 86 are connected for axial rotation to a pin shaft 92 which is rotatably disposed within a central bore 94 of the first pulley hub 36. The pin shaft 92 is therefore also co-axially aligned with the first CVT axis 88. An engagement end 96 of the pin shaft 92 extending through the torque converter 16 is meshed, for example by a spline gear, for co-rotation with a flex plate of the transmission. The flex plate rotates at a rotational speed of the engine 12 and the input shaft 20, such that the pin shaft 92, and thereby the vanes 90 of the hydraulic pump 86 continuously rotate during operation of the engine 12 regardless of the output of the transmission 12.

The second pulley assembly 28 includes the axially rotatable truncated conical third pulley sheave 40 which is fixed to the elongated second pulley hub 42. The truncated conical fourth pulley sheave 44 is axially displaceable toward and away from the third pulley sheave 40 co-axial to a second CVT axis 98 using a hydraulic controlled piston and fluid pressure controlled by the hydraulic control system 84. According to several aspects, the second CVT axis 98 is parallel to the first CVT axis 88. The flexible member 30 having an approximately V-shaped cross section is frictionally engaged between the first and the second pulley sheaves 34, 38 of the first pulley assembly 26 and also between the third and the fourth pulley sheaves 40, 44 of the second pulley assembly 28, such that rotation of the first pulley assembly 26 co-rotates the second pulley assembly 28. It should be appreciated that other types of belts, including positive engagement devices, may be employed without departing from the scope of the present disclosure. The third pulley sheave 40 and the second pulley hub 42 co-rotate with respect to the second CVT axis 98 which also extends through the transmission output assembly 22. The fourth pulley sheave 44 also co-rotates with respect to the second CVT axis 98 when the fourth pulley sheave 44 is frictionally engaged to the flexible member 30.

A ratio of the first pulley assembly 26 to the second pulley assembly 28 is adjusted by varying a spacing between the first and the second pulley sheaves 34, 38 and by adjusting a spacing between the third and the fourth pulley sheaves 40, 44. For example, to change the ratio between the first and the second pulley assemblies 26, 28, the axial distance between first and the second pulley sheaves 34, 38 may be reduced by moving the second pulley sheave 38 towards the first pulley sheave 34, while simultaneously the axial distance between the third and the fourth pulley sheaves 40, 44 may be increased by moving the fourth pulley sheave 44 away from the third pulley sheave 40. Due to the V-shaped cross section of the flexible member 30, the flexible member 30 rides higher on the first pulley assembly 26 and lower on the second pulley assembly 28 as shown at a flexible member position 100. In contrast, the flexible member 30 rides lower on the first pulley assembly 26 and higher on the second pulley assembly 28 as shown at a flexible member position 102.

Therefore the effective diameters of the first and the second pulley assemblies 26, 28 change, which in turn changes the overall gear ratio between the first pulley assembly 26 and the second pulley assembly 28. Because a radial distance "D" between the first and the second pulley assemblies 26, 28 (also defined as the distance between the first and the second CVT axes 88, 98) and the length of the flexible member 30 is constant, the opposite axial displacements of the second and the fourth pulley sheaves 38 and 44 must occur simultaneously in order to maintain the proper amount of tension on the flexible member 30 to assure torque is transferred from the first and the second pulley assemblies 26, 28 to the flexible member 30. The first pulley hub 36 is retained within the transmission housing 18 for axial rotation with respect to the first CVT axis 88 by bearing assemblies $B_1$, $B_2$. The second pulley hub 42 is retained within the transmission housing 18 for axial rotation with respect to the second CVT axis 98 by bearing assemblies $B_3$, $B_4$.

Components of the transmission output assembly 22 are co-axially aligned with the second CVT axis 98, and include a two mode transfer gear assembly 104 which includes the first planetary gear set 50 and the second planetary gear set 52 co-axially aligned with the second CVT axis 98. The transmission output assembly 22 further includes a clutch assembly 106 having the first clutch brake 62 engaged to provide reverse operation, the clutch 64 engaged for high speed, low torque output, and the second clutch brake 72 engaged for low speed, high torque output, each co-axially aligned with the second CVT axis 98. The first planetary gear set 50 and the second planetary gear set 52, as well as the first and the second clutch brakes 62, 72 and the clutch 64 are positioned within a housing portion 108 of the housing 18 of the transmission output assembly 22. The outputs of the first and second planetary gear sets 50, 52 rotate a final drive planetary gear set 110 which rotates a differential gear assembly 112. The differential gear assembly 112 rotates axle halves of a drive axle 114 which may be divisible into a first drive axle half 114a and a second drive axle half 114b, which are also both co-axially aligned with the second CVT axis 98.

The two axis, two mode CVT 14 of the present disclosure disposes rotating components co-axial to either the first CVT axis 88 or the second CVT axis 98. Components of the CVT 14 that are arranged co-axial with the first CVT axis 88 include: the output of the engine 12, the torque converter 16, the transmission input shaft 20, the first and second pulley sheaves 34, 38, the first pulley hub 36, the pin shaft 92, and the vanes 90 of the hydraulic pump 86. Components of the CVT 14 that are arranged co-axial with the second CVT axis 98 include: the third and fourth sheaves pulley 40, 44, the second pulley hub 42, and the components of the transmission output assembly 22, which include the first planetary gear set 50 and the second planetary gear set 52, the first and second clutch brakes 62, 72 and the clutch 64, the differential 112, and the drive axle 114.

Referring to FIG. 5 and again to FIG. 4, the second pulley hub 42 includes an axially extending hub sleeve 116 defining a transmission input member. The first drive axle half 114a of the drive axle 114 is rotatably disposed within a longitudinal bore 118 extending through each of the second pulley hub 42 and the hub sleeve 116 and is rotationally supported to the second pulley hub 42 and the inner wall of the longitudinal bore 118 by a plurality of bushings and bearings, such as a bearing 120. The sun gear 60 of the second planetary gear set 52 is rotatably supported externally on the hub sleeve 116 by a bushing 122. The sun gear 60 is connected by the combined connecting member 70 to the second clutch brake 72 which when engaged grounds the sun gear 60. The combined connecting member 70 is rotatably supported by a bushing 124 to internal structure of the transmission output assembly 22. Internal structure of the transmission output assembly 22 also supports the second clutch brake 72, which includes interleaved friction or reaction plates 126A, 126B. The plates 126A are slidably splined or connected to a flange portion 128 of the combined connecting member 70. The plates 126B are slidably splined or connected to the internal structure. A hydraulically actuated piston 130 selectively engages the second clutch brake 72 by compressing the interleaved plates 126A, 126B together so that torque is transferred in a path including the second clutch brake 72 and the sun gear 60.

The clutch 64 includes interleaved friction or reaction plates 132A, 132B. The plates 132A are slidably splined or connected to a flange portion 134 of the extending portion 74 of the combined connecting member 70. The combined connecting member 70 is therefore connected to both the second clutch brake 72 and the clutch 64. The plates 132B of the clutch 64 are slidably splined or connected to a flange portion 136 of the ring gear connecting member 68. The ring gear connecting member 68 is meshed to the ring gear 56 of the first planetary gear set 50. Each of the planet gears 76 are rotatably supported using a pin 140. A hydraulically actuated piston 142 selectively engages the clutch 64 by compressing the interleaved plates 132A, 132B together so that torque is transferred in a path between the clutch 64 and the extending portion 74 of the combined connecting member 70.

The first clutch brake 62 includes interleaved friction or reaction plates 142A, 142B. The plates 142A are slidably splined or connected to structure of the housing portion 108 of the transmission output assembly 22. The plates 142B are slidably splined or connected to a flange portion 144 of the ring gear connecting member 68. A hydraulically actuated piston 146 selectively engages the first clutch brake 62 by compressing the interleaved plates 142A, 142B together so that the ring gear 56 of the second planetary gear set 52 is grounded via the ring gear connecting member 68 to the housing portion 108 of the transmission output assembly 22.

The sun gear 54 of the first planetary gear set 50 is connected using a spline gear 148 to the hub sleeve 116. The sun gear 60 of the second planetary gear set 52 is meshed with the elongated planet gears 76. The elongated planet gears 76 are rotatably coupled to both a first carrier 150 of the first planetary gear set 50 and to a second carrier 152 of the second planetary gear set 52. The first carrier 150 and the second carrier 152 are both coupled to the common carrier member 66 which is rotatably supported by a bushing 154 to the axle portion 114a. The ring gear connecting member 68 is rotatably supported at one end by a bushing 156 to the common carrier member 66. Rotational force of the common carrier member 66 is used to rotate the final drive planetary gear set 110 by meshing an elongated shaft portion of the common carrier member 66 to a sun gear 158 of the final drive planetary gear set 110 using a spline gear 160.

Engagement of the first clutch brake 62 provides a reverse drive torque. Engagement of the clutch 64 provides a high speed, low forward drive torque over an underdrive to an overdrive range of belt displacement on the first and the second pulley assemblies 26, 28. Engagement of the second clutch brake 72 provides a low speed, high forward drive torque over the underdrive to the overdrive range of belt displacement on the first and the second pulley assemblies 26, 28.

Returning to FIGS. 4-5, the final drive unit 32 includes the differential 112 and axle halves 114a, 114b that provide drive torque to a set of road wheels (not shown). During operation of the CVT 14, engine speed and torque is supplied through the torque converter 16 to the first and the second pulley assemblies 26, 28, and from the hub sleeve 116 of the second pulley assembly 28 through the transmission output assembly 22 to the final drive unit 32. Engagement of the clutch 64, the second clutch brake 72, or the first clutch brake 62 selectively provide forward and reverse rotations. Axial displacement of the displaceable sheaves 38, 44 of the first and the second pulley assemblies 26, 28 provides a range of continuous forward or reverse speed ratios varying from an underdrive to an overdrive. Each of the first and second planetary gear sets 50, 52 also provides a step up or step down in speed ratio thus providing two modes or ranges of continuously variable forward or reverse speed ratios. Speed and torque are then transferred to the final drive unit 32 to propel the motor vehicle.

The twin axis two-mode CVT 14 of the present disclosure offers several advantages. As noted herein, axially rotating components of the CVT 14 are substantially all arranged to be co-axial to either the first CVT axis 88 or the second CVT axis 98. This configuration eliminates the separate transfer shaft normally positioned off axis between planetary gear sets and a final drive unit of common 4-axis transmissions, and co-axially aligns components of the final drive unit 32 on the second CVT axis 98. The radial distance "D" between the first and the second pulley assemblies 26, 28 is also therefore reduced, with the components of the transmission output assembly 22 all axially mounted along the second CVT axis 98. A width "W" of the CVT 14 is minimized because only the torque converter 16 and the first pulley assembly 26 are mounted on the first CVT axis 88, with the second pulley assembly 28 and the components of the transmission output assembly 22 all mounted on the second CVT axis 98.

The description of the invention is merely exemplary in nature and variations that do not depart from the gist of the invention are intended to be within the scope of the invention. Such variations are not to be regarded as a departure from the spirit and scope of the invention.

The following is claimed:

1. A continuously variable transmission (CVT) for a motor vehicle, comprising:
    a torque converter connected to an engine, the torque converter rotating with respect to a first CVT axis;
    a first pulley assembly having a first pulley hub coaxially aligned with the first CVT axis and rotated by the torque converter;
    a second pulley assembly aligned on a second CVT axis;
    a flexible member coupling the first pulley assembly to the second pulley assembly;
    a two mode transfer gear assembly connected to the second pulley assembly, the two mode transfer gear assembly including multiple gears transferring power to a differential, all of the multiple gears coaxially aligned for rotation on the second CVT axis for rotation by the second pulley assembly;
    the multiple gears of the two mode transfer gear assembly include a planetary gear assembly and the two mode transfer gear assembly further includes a clutch assembly having at least one clutch connected to the planetary gear assembly;
    the planetary gear assembly includes:
        a first planetary gear set having a sun gear and a ring gear;
        a second planetary gear set having a sun gear; and
        a common planet carrier member connected to both the first planetary gear set and the second planetary gear set, the common planet carrier rotatably supporting a set of planet pears having stepped pinions including a first stepped portion and a second stepped portion; and
    a final drive unit including the differential rotatable and co-axially aligned with respect to the second CVT axis and rotated by the second pulley assembly.

2. The continuously variable transmission (CVT) of claim 1, further including a carrier hub connected to the common planet carrier and co-axially aligned with respect to the second CVT axis.

3. The continuously variable transmission (CVT) of claim 1, wherein the clutch assembly includes a first clutch brake having interleaved plates connected to structure of a housing portion of the CVT and to a ring gear connecting member, the ring gear connecting member connected to the ring gear of the first planetary gear set.

4. The continuously variable transmission (CVT) of claim 3, wherein the clutch assembly further includes:
    a clutch having interleaved plates connected to the ring gear connecting member and to a combined connecting member; and
    a second clutch brake having interleaved plates connected to structure of the housing portion and to the combined connecting member.

5. The continuously variable transmission (CVT) of claim 4, wherein:
    the combined connecting member is connected to the sun gear of the second planetary gear set;
    the first stepped portion of the planet gears are configured to intermesh with the sun gear of the second planetary gear set; and
    the second stepped portion of the planet gears are configured to intermesh with both the ring gear and a set of non-stepped planet gears of the first planetary gear set.

6. The continuously variable transmission (CVT) of claim 1, wherein the final drive unit includes a final drive planetary gear set connected between a carrier hub and the differential.

7. The continuously variable transmission (CVT) of claim 6, wherein the carrier hub is splined to a sun gear of a final drive planetary gear set of the final drive unit.

8. The continuously variable transmission (CVT) of claim 1, further including:
    a hydraulic pump connected to a transmission housing positioned proximate the first pulley assembly; and
    a pin shaft rotatably disposed within and extending through a central bore of the first pulley hub, the hydraulic pump having vanes connected for axial rotation to the pin shaft;
    wherein the pin shaft is co-axially aligned with the first CVT axis.

9. The continuously variable transmission (CVT) of claim 8, wherein the pin shaft further extends through the torque converter to connect to a torque converter housing such that the pin shaft and the torque converter housing rotate at a rotational speed of the engine.

10. The continuously variable transmission (CVT) of claim 1, wherein the second pulley assembly includes a second pulley hub defining an elongated shaft co-axially aligned with and axially rotatable with respect to the second CVT axis.

11. The continuously variable transmission (CVT) of claim 1, wherein the final drive unit includes a drive shaft rotatable and co-axially aligned with respect to the second CVT axis.

12. A continuously variable transmission (CVT) for a motor vehicle, comprising:
    a torque converter connected to an engine, the torque converter rotating with respect to a first CVT axis;
    a first pulley assembly connected for axial rotation to the torque converter and co-axially disposed for rotation on the first CVT axis;
    a second pulley assembly including an elongated shaft co-axially aligned with and axially rotatable with respect to a second CVT axis, the second pulley assembly rotatably connected to the first pulley assembly by a flexible member wrapped around the first pulley assembly and the second pulley assembly;
    a two mode transfer gear assembly connected to the elongated shaft and coaxially aligned for rotation on the second CVT axis, the two mode transfer gear assembly including a first planetary gear set, and a second planetary gear set;

a final drive unit connected to the transfer gear assembly, the final drive unit including a differential and a drive shaft each rotatable and co-axially aligned with respect to the second CVT axis, the drive shaft extending through the elongated shaft of the second pulley assembly;

a clutch assembly including a first clutch brake having:
first interleaved plates connected to a second flange portion of a ring gear connecting member; and
second interleaved plates selectively connecting the clutch to a combined connecting member, the combined connecting member connected to a sun gear of the second planetary gear set; and the clutch assembly further including a clutch having:
first interleaved plates connected to a second flange portion of the ring gear connecting member; and
second interleaved plates selectively connecting the clutch to a combined connecting member, the combined connecting member connected to a sun gear of the second planetary gear set.

13. The continuously variable transmission (CVT) of claim 12, wherein the clutch assembly further includes a second clutch brake having:
first interleaved plates connected to structure of the housing portion of the transmission output assembly; and
second interleaved plates connecting the second clutch brake to the combined connecting member.

14. The continuously variable transmission (CVT) of claim 12, wherein:
the first pulley assembly includes:
an axially rotatable first truncated conical pulley sheave which is fixed to a first pulley hub; and
a truncated conical second pulley sheave axially displaceable toward and away from the first pulley sheave; and
the second pulley assembly includes:
an axially rotatable truncated conical third pulley sheave fixed to an elongated second pulley hub; and
a truncated conical fourth pulley sheave axially displaceable toward and away from the third pulley sheave co-axial to the second CVT axis.

* * * * *